Dec. 8, 1931.  P. F. LEMKE  1,835,503
FOCUSING LENS MOUNTING
Filed July 29, 1929
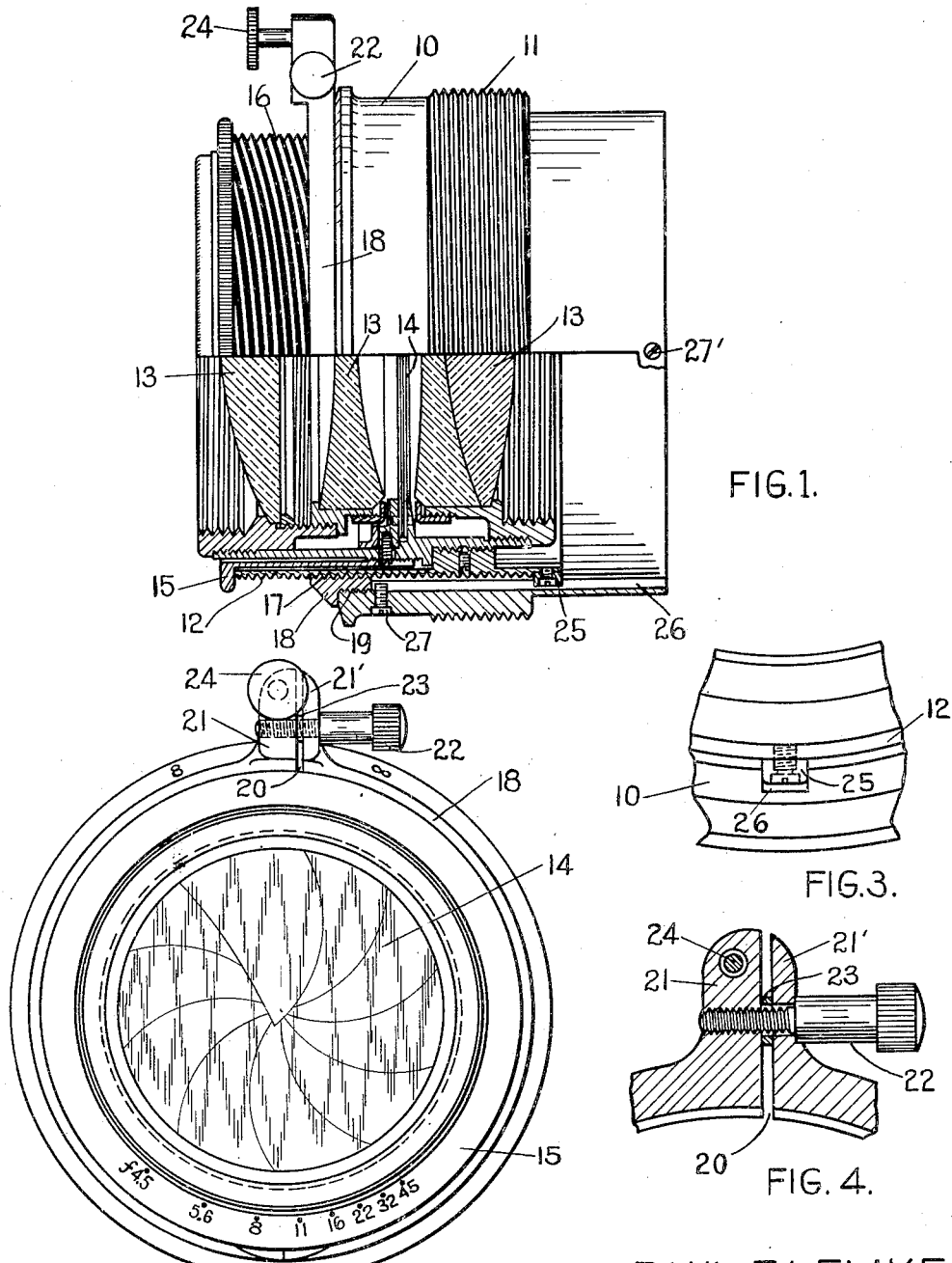
FIG. 1.
FIG. 2.
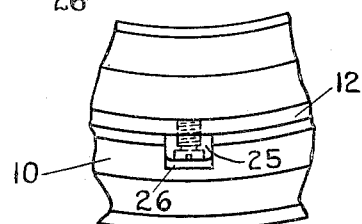
FIG. 3.
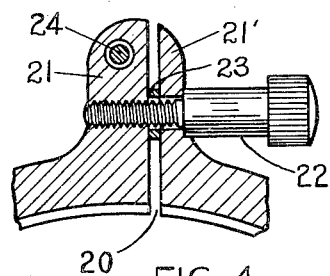
FIG. 4.
PAUL F. LEMKE.
INVENTOR
BY *G. A. Ellestad*
ATTORNEY Patented Dec. 8, 1931

1,835,503

UNITED STATES PATENT OFFICE

PAUL F. LEMKE, OF GREECE, NEW YORK, ASSIGNOR TO BAUSCH & LOMB OPTICAL COMPANY, OF ROCHESTER, NEW YORK, A CORPORATION OF NEW YORK

FOCUSING LENS MOUNTING

Application filed July 29, 1929. Serial No. 381,703.

This invention relates to lens mountings and more particularly it has reference to photographic lens mountings, known as focusing mountings, wherein a lens element or elements may be moved and adjusted for the purpose of focusing the lens for different object distances.

In one type of such mountings, a barrel carrying the lens elements is mounted for axial movement within a tube which is secured to the lens board or wall of the camera. Rotatably mounted on the tube is a threaded ring having engagement with the outer threaded surface of the lens barrel. A lug on the barrel slides in a groove in the tube so that by rotating the ring the lens barrel is moved axially within the tube for the purpose of focusing the lens.

When such a focusing mounting is mechanically well made and fitted, it provides an altogether satisfactory and efficient device which is free from loose and wobbly construction. However, from a mechanical standpoint, it is very difficult to provide a snug fit between the threaded ring and all portions of the threaded surface of the lens barrel, especially on barrels having relatively large lengths and diameters. Such a construction, with a poorly fitted thread which will allow the lens barrel to wobble in the tube, is objectionable and becomes especially troublesome when the mounting is used on aerial cameras which are subjected to considerable vibration when in use. The difficulty in obtaining a good fit between the threaded ring and barrel is hard to overcome when it is desired to manufacture such mountings on a production basis.

One of the objects of the present invention is to overcome these objectionable features and provide a focusing lens mounting of the character described which will be efficient in operation and possess advantages as regards manufacturing. Another object is to provide a focusing lens mounting of the type described with means for adjusting the degree of engagement between the threaded ring and threaded lens barrel. These and other objects and advantages reside in certain novel features of construction, arrangement and combination of parts as will hereinafter be more fully described and pointed out in the appended claims.

Referring to the drawings:

Fig. 1 shows a view of a lens mounting embodying my invention with parts in section and parts in elevation.

Fig. 2 is a front view of the mounting as seen from the left of Fig. 1.

Fig. 3 is an enlarged fragmentary view showing a detail of construction of the lens barrel and tube as seen from the right of Fig. 1.

Fig. 4 is a fragmentary sectional view showing a detail of the focusing ring.

A preferred embodiment of my invention is illustrated in the drawings wherein 10 indicates a tube having a threaded portion 11 adapted to be screwed into a flange on the lens board or wall of a camera. Mounted within the tube 10 is the lens barrel 12 which carries, by means of suitable cells, the lens elements 13. The barrel also carries the usual type of iris diaphragm 14 which may be adjusted by means of the rotatable member 15. This structure, which is well known in the art, forms no part of the present invention and hence a detailed description is omitted.

The outer surface of the lens barrel 12 is threaded as shown at 16 to cooperate with the threaded portion 17 on the inner side of focusing ring 18. The outer side of ring 18 is in threaded engagement with the tube 10 as shown at 19, thereby permitting a limited rotation of the ring 18. The focusing ring 18 is split as shown at 20 so that the ring terminates in the two spaced ends 21 and 21'. An adjusting screw 22 passes through an oversize hole in end 21' and is threaded into end 21 so that by adjusting the screw 22 one may vary the degree of engagement between the threads 17 on ring 18 and the threads 16 on barrel 12. A suitable spacing washer 23 is slipped over screw 22 between the two ring ends 21 and 21'. A finger piece 24, mounted on end 21, furnishes a convenient means for turning the ring 18. A lug or key 25 secured to barrel 12 travels in a linear groove 26 which is cut on the inner surface of tube 10 so that when the focusing ring 18 is rotated, the lens barrel 12 moves axially for focusing. Stop screws 27 and 27' limit the axial movement of the barrel.

From the foregoing, it will be apparent that I am able to attain the objects of my invention and provide an efficient focusing lens mounting. In manufacturing this mounting it is not necessary that extreme care be exercised in securing a snug fit between the threaded ring 18 and the threaded portion 16 of barrel 12, as any slight variations can be satisfactorily adjusted by means of screw 22. It is necessary to use the spacing washer 23 in order to prevent tightening the screw 22 to such an extent that it would lock the ring 18 and prevent rotation thereof. In case the threads 16 become worn so that barrel 12 fits loosely, it is only necessary to file off a slight amount from the spacing washer 23 and then tighten screw 22.

Various modifications can obviously be made without departing from the spirit of my invention as pointed out in the appended claims.

I claim:

1. A lens mounting comprising a tube, a barrel carrying lens elements, the outer surface of said barrel being threaded, a ring rotatably mounted on said tube, said ring having a portion engaging the threads on said barrel and means on said ring for varying the degree of engagement between said ring and said barrel.

2. A lens mounting comprising the combination of a tube, a lens barrel movably mounted within said tube, means for moving said barrel axially, said means comprising a rotatable ring having threaded engagement with said barrel, means for producing a variation in the degree of engagement between said ring and barrel and means for limiting said variation.

3. A focusing lens mounting comprising a tube, a lens barrel mounted for axial movement within said tube, the outer portion of said barrel being threaded, a ring rotatably mounted on said tube, said ring having a threaded portion engaging the threaded portion on said barrel whereby the barrel may be moved upon rotation of said ring and means carried by said ring for varying the degree of engagement between said barrel and ring.

4. A focusing lens mounting comprising a tube, a lens barrel mounted for axial movement within said tube, said barrel having a threaded portion, means for axially moving said barrel, said means comprising a ring rotatably mounted on said tube, said ring having a threaded portion engaging the threaded portion of said barrel, means for preventing rotation of said barrel and means on said ring for varying the degree of engagement between said ring and barrel.

PAUL F. LEMKE.